Patented July 11, 1950

2,514,648

UNITED STATES PATENT OFFICE 2,514,648

PREPARATION OF MONOMERIC 2,2,4-TRIMETHYL-1,2-DIHYDRO-QUINOLINE

Henry J. Kehe, Akron, Ohio, assignor to The B. F. Goodrich Company, New York, N. Y., a corporation of New York No Drawing. Application October 14, 1949, Serial No. 121,453

1 Claim. (Cl. 260—283)

This invention relates to an improved method of preparing substantially pure monomeric 2,2,4-trimethyl-1,2-dihydro-quinoline and more specifically pertains to depolymerization of polymeric 2,2,4-trimethyl-1,2-dihydro-quinoline in the presence of a boron trifluoride catalyst.

2,2,4-trimethyl-1,2-dihydro-quinoline results from the condensation reaction of 1 mole of aniline with 2 moles acetone in the presence of a condensation catalyst such as hydrochloric acid. The monomeric material is first formed by the reaction but the rate of the condensation reaction is quite slow compared to the rate at which the monomeric material polymerizes. Consequently the reaction product never consists of pure monomer and is generally a mushy syrup-like mixture of the monomer and its polymer. Such a mixture is difficult to handle and to separate into its component parts. In commercial preparation the reaction mixture is heated beyond the time necessary for condensation in order to bring about a substantially complete polymerization, so that the product consists substantially entirely of polymer, and is easily recovered in the form of solid amber pellets.

Various attempts have been made to convert the solid polymer into substantially pure monomer. It has been reported in the literature that polymeric 2,2,4-trimethyl-1,2-dihydro-quinoline can be depolymerized by slow distillation at reduced pressure in the presence of a strong acid such as phosphoric acid. In this manner 62% of the polymer is converted to the monomer [J. Am. Chem. Soc. 60, 1458 (1938)]. The literature also suggests the use of hydrochloric acid, hydrobromic acid and sulfuric acid in the low pressure distillation of the polymer to obtain the monomeric material [Ann. 472, 1 (1929)]. However, none of the proposed methods of depolymerizing the polymer have been found to yield the monomer in a substantially pure form. Rather these methods also result in a breakdown of the polymer to methane and 2,4-dimethyl-quinoline, the latter of which is exceedingly difficult to separate from monomeric 2,2,4-trimethyl-1,2-dihydro-quinoline. This breakdown can be represented by the following equation:

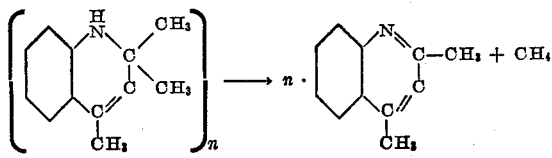

where $n$ is the number of monomer units in the polymer.

The principal object of this invention is to provide a process whereby it is possible to recover high percentages of substantially pure monomeric 2,2,4-trimethyl-1,2-dihydro-quinoline, uncontaminated by the depolymerization by-products hereinbefore described, from either the syrup-like mixture of monomer and polymer or from the resinous pellet polymer. The pure monomeric material is useful as a chemical intermediate in organic synthesis and also as an age-resister or antioxidant in rubber compositions, motor fuels, etc. The polymer is, of course, a well known antioxidant but, unlike the polymer, the substantially pure monomer is a free-flowing oil and can be dispersed more easily and readily in rubber or in any other material where its antioxidant properties are desired.

I have discovered that pure monomeric 2,2,4-trimethyl-1,2-dihydro-quinoline can be obtained from the syrup-like mixture of monomer and polymer or from the solid resinous polymer in substantially quantitative yields by depolymerizing the polymer in the presence of a small amount of boron trifluoride catalyst. The amount of boron trifluoride catalyst giving optimum results is from about 1% to about 10% of $BF_3$ by weight based on the amount of the polymeric product being used. Using this amount of catalyst a recovery of over 95% of monomer free from decomposition products is achieved.

Since boron trifluoride is a gas, it is advantageous to employ one of the many boron trifluoride complexes as the catalyst in the practice of this invention. For example, such organo complexes of boron trifluoride as those formed with acetic acid, aniline, ethyl alcohol, methyl alcohol, acetone, nitrobenzene, pentene, decene, benzene, toluene, diethyl ether, phenyl methyl ether, phenyl ether, diisopropyl ether, etc. may be used. These boron trifluoride catalyst compositions can be conveniently prepared by passing boron trifluoride gas into the organic compound until the desired amount of $BF_3$ is consumed in forming the complex. Such boron trifluoride complexes are well known and have been employed as catalysts for various polymerization processes. This invention contemplates the use of boron trifluoride itself as well as the boron trifluoride organo complexes where the term "a boron trifluoride catalyst" is used herein.

The depolymerization is preferably carried out by first charging the boron trifluoride catalyst to a still pot fitted with fractionating equipment, then charging the material to be depolymerized containing 2,2,4-trimethyl-1,2-dihydro-quinoline polymer and heating the resulting mixture to bring about depolymerization. During the heating the polymer molecule is split into vapors of the monomer which distill over and are condensed and recovered. To reduce as much as possible the charring and complete thermal decomposition of the organic materials present, it is preferred to carry out the depolymerization at a reduced pressure, preferably a pressure of about 10 mm. of Hg or less.

When following the above-described procedure, the boron trifluoride forms a complex with the quinoline compound and is not dissipated during the depolymerization and distillation process. This quinoline boron trifluoride complex remains as a residue in the still pot and consequently the theoretical amount of the monomer is not recovered in the first depolymerization. But this residue can be employed in subsequent depolymerizations as a source of boron trifluoride catalyst without adding additional $BF_3$. When this residue is thus employed, the yields of the desired monomeric product increase substantially and approach the theoretical yield. The quinoline boron trifluoride complex appears to be quite stable for it can be employed a great number of times in subsequent depolymerizations.

The process can be carried out as a batch process as described above or it can be readily carried out as a continuous operation. For example, when the monomer begins to distill off, additional polymer or polymer containing material may be added to the still pot at a rate sufficient to maintain best operating conditions.

The following specific examples illustrate the process of my invention in more detail. In the examples, all parts are by weight.

*Example I*

126.5 parts of aniline were charged to a still pot having a distillation column and a fraction cutting head attached thereto. Then 25 parts of gaseous boron trifluoride were added to the aniline and an aniline-boron trifluoride complex was formed. 1,000 parts of amber resinous pellets of polymeric 2,2,4-trimethyl-1,2-dihydro-quinoline were then charged to the catalyst and the resulting mixture was heated under reduced pressure of about 1.0 mm. Hg. First the aniline boiled off and was recovered. Then vapors of monomeric 2,2,4-trimethyl-1,2-dihydro-quinoline distilled off at a temperature of 83° C. to 90° C. and were condensed and collected. A yield of 753 parts (75.3%) of the liquid monomer was obtained. A black residue, 362 parts, remained in the still pot. It was determined that this residue contained substantially all of the $BF_3$ charged to the still pot.

*Example II*

To the 362 parts of the $BF_3$ containing residue remaining in the still pot as described in Example I, there was added 1,000 parts of resinous polymeric 2,2,4-trimethyl-1,2-dihydro-quinoline. The mixture was then heated under reduced pressure of 6 mm. Hg whereupon monomeric 2,2,4-trimethyl-1,2-dihydro-quinoline vapors came off at 91° C. to 112° C. The vapors were condensed and collected to recover 968 parts (96.8% yield) of the liquid monomer in substantially pure form.

There was no 2,4-dimethyl-quinoline present in the monomeric products of Examples I and II. Hence, there is a marked improvement in the process of this invention over the processes for depolymerization of the polymer heretofore proposed, as herein described.

I claim:

The process which comprises heating a polymer of 2,2,4-trimethyl-1,2-dihydro-quinoline under reduced pressure in the presence of a boron trifluoride catalyst whereupon depolymerization of said polymer occurs and vapors of monomeric 2,2,4-trimethyl-1,2-dihydro-quinoline are formed, condensing the vapors and collecting the said monomeric material in substantially pure liquid form.

HENRY J. KEHE.

No references cited.